(12) United States Patent
Hardjono

(10) Patent No.: US 6,301,662 B1
(45) Date of Patent: Oct. 9, 2001

(54) AUTHENTICATION OF ROUTING DATA USING VARIABLE OUTPUT LENGTH ONE-WAY FUNCTIONS

(75) Inventor: Thomas P. Hardjono, Arlington, MA (US)

(73) Assignee: Nortel Networks Corporation, Montreal (CA)

( * ) Notice: Subject to any disclaimer, the term of this patent is extended or adjusted under 35 U.S.C. 154(b) by 0 days.

(21) Appl. No.: 09/138,300

(22) Filed: Aug. 21, 1998

(51) Int. Cl.$^7$ .................................................. G06F 1/24
(52) U.S. Cl. .......................................... 713/176; 713/179
(58) Field of Search .................................. 380/255, 277, 380/278; 713/176, 179, 180

(56) References Cited

U.S. PATENT DOCUMENTS

| | | | |
|---|---|---|---|
| 6,023,471 | * 2/2000 | Haddock et al. | 370/426 |
| 6,101,255 | * 8/2000 | Harrison et al. | 380/52 |
| 6,111,660 | * 8/2000 | Murray | 358/433 |
| 6,115,392 | * 9/2000 | Nomura | 370/466 |

OTHER PUBLICATIONS

Y. Zheng, et al., "HAVAL—A One–Way Hashing Algorithm with Variable Length of Output," Centre for Computer Security Research, Univ. of Wollongong, Australia, Jul. 28, 1994.

B.R. Smith, et al., Securing Distance–Vector Routing Protocols, IEEE, 1997.

K.E. Sirois and S.T. Kent, "Securing the Nimrod Routing Architecture," IEEE, 1997.

K. Zhang, "Efficient Protocols for Signing Routing Messages," Cambridge Univ. Computer Laboratory, Cambridge, UK.

S.L. Murphy and M.R. Badger, "Digital Signature Protection of the OSPF Routing Protocol," IEEE, 1996.

R. Hauser, et al., "Reducing the Cost of Security in Link-State Routing," IEEE, 1997.

S. Murphy, et al., "OSPF with Digital Signatures," RFC 2154, Jun. 1997.

T. Pusateri, "Multicast Routing Protocol Security," Internet Draft, Aug. 1998.

R. Rivest, "The MD5 Message–Digest Algorithm," RFC 1321, Apr. 1992.

A. Heffernan, "Protection of BGP Sessions Via the TCP MD5 Signature Option,"Internet Draft, Mar. 12, 1998.

J. Moy, "OSPF Version 2," RFC 1583, Mar. 1994.

* cited by examiner

Primary Examiner—Thomas R. Peeso
(74) Attorney, Agent, or Firm—Blakely Sokoloff Taylor & Zafman LLP

(57) ABSTRACT

A method and apparatus for authenticating routing data in a network. In one embodiment, the described method includes the step of generating routing data that described a topology of the network. The routing data has a length equal to a routing data length. A variable output length (VOL) tag length is selected for the output of a VOL one-way function. The VOL one-way function is performed on the routing data, the routing data length and the adjustable VOL tag length to generate a VOL tag having a length equal to the VOL tag length. In one embodiment, the VOL tag is digitally signed using a private key of the box that generates the VOL tag. The routing data, the routing data length, the adjustable VOL tag length, the VOL tag and the signature are transferred in a packet from a first box, which is the box that generates the VOL tag, to a second box. The second box that receives the packet generates a comparison tag using the VOL one-way function based on data received from the packet. The comparison tag is compared against the received VOL tag to confirm the authenticity of the data of the packet. In one embodiment, the public key of the first box is used to verify the source of the VOL tag based on the received signature. In one embodiment, the VOL tag length may be adjusted to accommodate the workloads of the first and second boxes.

28 Claims, 4 Drawing Sheets

AUTHENTICATION OF ROUTING DATA USING VARIABLE OUTPUT LENGTH ONE-WAY FUNCTIONS

BACKGROUND OF THE INVENTION

1. Field of the Invention

The present invention relates generally to data networks and, more specifically, the present invention relates to transferring routing data in a data network.

2. Background Information

Data networks allow many computers or network resources to be connected together over short and long distances for countless numbers of purposes. There are many types of topologies that may be used when linking together the resources of a network. For example, resources in a network may be connected in a star configuration, a bus configuration, a ring configuration, or a combination of these topologies. As such, there may be more than one path from one box to another box in the network. In addition, the topology of the network may dynamically change as links in the network may sometimes be introduced or removed without notice.

In many networks, information is routed throughout the network using packets. Routing protocols of the network dynamically configure and distribute information regarding the topology of the network among the boxes, such as for example routers, in the network. There are many known routing protocols for distributing routing data among the routers of a network regarding the topology of a network. Some of these known protocols include Routing Information Protocol (RIP), the Open Shortest Path First (OSPF), Distance Vector Multicast Routing Protocol (DVMRP), Multicast Open Shortest Path First (MOSPF), Protocol-Independent Multicast (PIM), to name a few. In OSPF, the routing data that is transferring among the routers is included in a link state advertisement (LSA).

By sharing the information regarding the topology of the network, or routing data, the boxes in the network are able to learn of all of the various paths throughout the network to communicate with one another. The routing data each box receives may be used as a basis when determining a "best" path for forwarding packets through the network from the source box to the destination box. Naturally, it is important that the routing data received by each box or router in the network is correct. Without accurate routing data, the data packets that are transmitted throughout the network may not reach their intended destination.

A concern for network engineers is that the transferring of the routing data among the routers on boxes in the network and may be subject to attack. For instance, an intruder may intercept packets containing routing data and modify the routing data to disrupt network communications. In another example, the routing data contained in the packets may be corrupted because of other problems in the links such as for example faulty communications lines. In either case, incorrect routing data transferred among the boxes in the network may have the undesired consequence of disrupting network communications.

SUMMARY OF THE INVENTION

A method and an apparatus for authenticating routing data in a network is disclosed. In one embodiment, an adjustable tag length is determined for the output of a variable output length one-way function. The variable output length one-way function is performed on routing data to generate a tag having a length of the adjustable tag length. The routing data and the tag are transferred from one box in the network to another box in the network. Additional features and benefits of the present invention will become apparent from the detailed description, figures and claims set forth below.

BRIEF DESCRIPTION OF THE DRAWINGS

The present invention is illustrated by way of example and not limitation in the accompanying figures.

DETAILED DESCRIPTION

A method and an apparatus for authenticating routing data transferred through network is disclosed. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

In one embodiment of the present invention, a source box, such as for example a router, in a network generates routing data describing the topology of at least a portion of the network using known protocols. The routing data is run through a variable output length (VOL) one-way function to generate a variable output length tag, which is used to authenticate the routing data. In one embodiment, the variable output length tag is digitally signed using a private key of the source box. When another box in the network, or a destination box, receives the routing data, the length of the routing data, the variable output length of the tag, the variable output length tag and the signature, the destination box is able to authenticate the received routing data, the length of the routing data and the variable output length of the tag by running these received values through the VOL one-way function to generate a comparison tag, which is then compared with the variable output length received tag. If the comparison tag matches the received variable output length tag, then the destination box may assume that the received information is authentic. In one embodiment of the present invention, the destination box can also decode the received signature using the public key of the source box that sent the signature to verify that the variable output length tag was actually generated by the source box.

Figure 1:
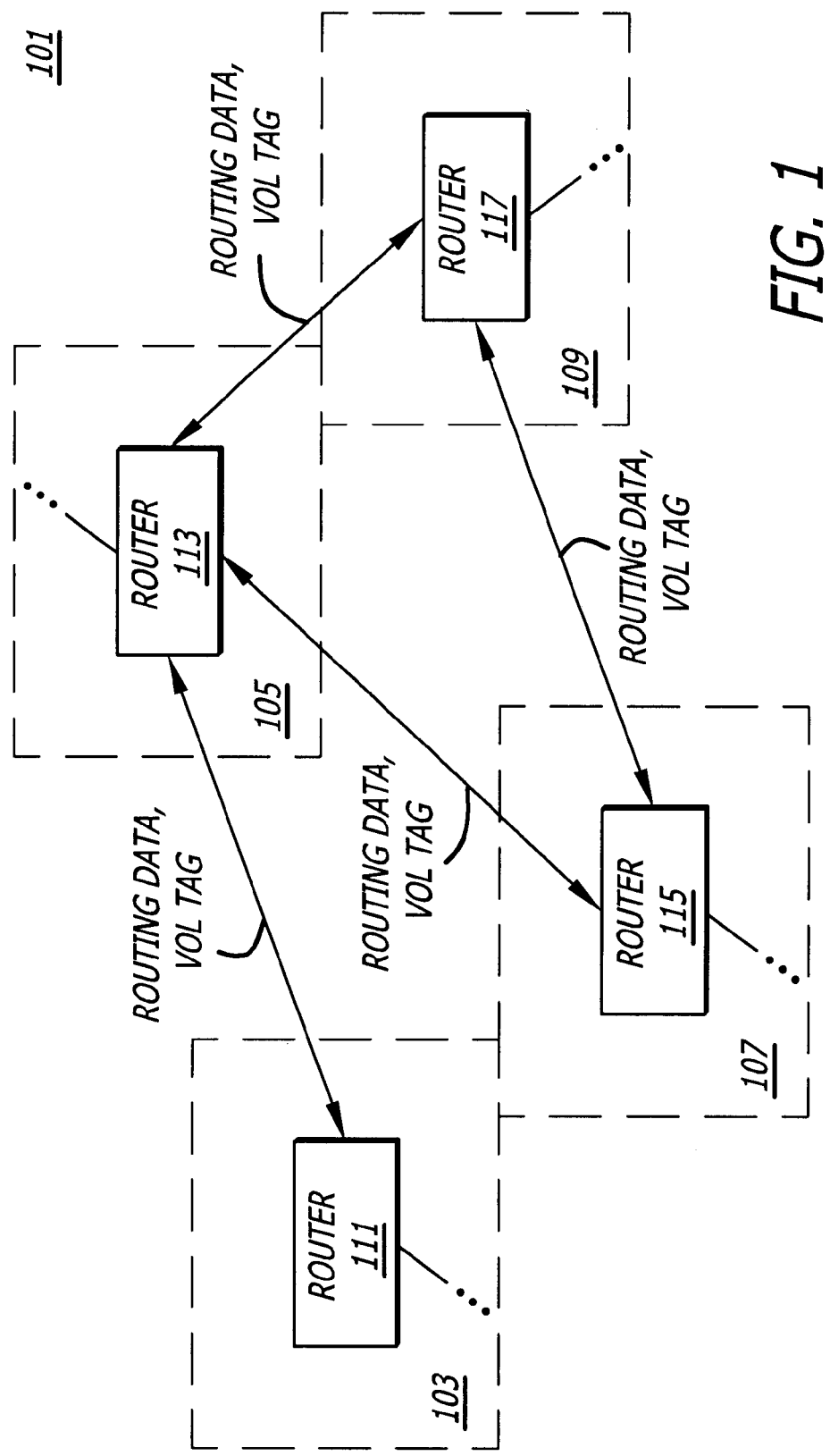
FIG. 1 is a diagram illustrating a routing domain including a plurality of boxes transferring routing data and variable output length tags in accordance with teachings of one embodiment of the present invention.

FIG. 1 is a diagram illustrating a routing domain 101 in accordance with teachings of the present invention. As shown in FIG. 1, routing domain 101 in one embodiment includes a plurality of areas 103, 105, 107 and 109. In the embodiment depicted in FIG. 1, each area 103, 105, 107 and 109 includes a plurality of boxes. In one embodiment, the plurality of boxes in area 103 includes box 111. The plurality of boxes in area 1 05 includes box 113. The plurality of boxes in box 107 includes box 115. The plurality of boxes in area 109 includes box 117. In one embodiment, boxes 111, 113, 115 and 117 are routers or the like. As illustrated in the embodiment depicted in FIG. 1, box 113 is directly coupled to boxes 111, 115 and 117 through the network. In addition, boxes 115 and 117 are directly coupled through the network. It is appreciated that the embodiment illustrated in FIG. 1 is provided for illustration purposes only and that other topologies may be utilized in accordance with the teachings of the present invention.

In one embodiment, each of the boxes 111, 113, 115 and 117 distribute information regarding the topology of routing domain 101 so that each of the boxes 111, 113, 115 and 117 may become aware of the various paths between each one of the boxes of routing domain 101. Thus, box 111 becomes aware that there is a path between box 111 and box 117 through box 113 and or through box 113 and box 115. In one embodiment, a known routing protocol, such as for example but not limited to Routing Information Protocol (RIP), Open Shortest Path First (OSPF), Distance Vector Multicast Routing Protocol (DVMRP), Multicast Open Shortest Path First (MOSPF) or Protocol-independent Multicast (PIM) or the like, is used when generating the routing data describing the topology of routing domain 101. For example, a detailed description of OSPF is provided in Moy, "OSPF Version 2," RFC 1583 (March 1994), which is incorporated in its entirety herein by reference.

As will be discussed in greater detail below, each of the boxes 111, 113, 115 and 117 also generates a variable output length (VOL) tag to accompany the routing data that is passed among the boxes of routing domain 101. As will be discussed, the VOL tag is used to authenticate the routing data in accordance with the teachings of one embodiment of the present invention. It is appreciated that the generation of the VOL tag burdens each respective box 111, 113, 115 or 117 with an additional workload because of the computations that are performed to generate the VOL tag. In accordance with one embodiment of the present invention, each box 111, 119, 115 and 117 also has the ability to adjust the length of the VOL tag generated by the respective box to compensate for the workload of the particular box.

For illustration purposes only, assume that the boxes in area 103 are carrying a relatively large amount of traffic and that the boxes in area 105 are carrying a relatively small amount of traffic. In this instance, the VOL tags generated by box 111 may be adjusted to be shorter to reduce the overall workload of box 111 when generating VOL tags. Since the traffic in area 105 is relatively small, the VOL tags generated by box 113 may be adjusted to be relatively long to achieve a higher degree of authentication. Furthermore, it is appreciated that in one embodiment of the present invention, each box 111, 113, 115 or 117 can interpret VOL tags of varying lengths, even if the lengths of the VOL tags received by a particular box are different than the lengths of the VOL tags that are sent by that box. Therefore, the VOL tags generated by box 111 do not have to be the same length as the VOL tags generated by box 113 and vice versa in accordance with the teachings of one embodiment of the present invention.

It is appreciated that there may be other factors that would influence the lengths to which the VOL tags should be adjusted. These features may include for example, but are not limited to, knowledge of possible intruders, knowledge of a lack of possible intruders, knowledge of faulty communications lines, etc.

Figure 2:
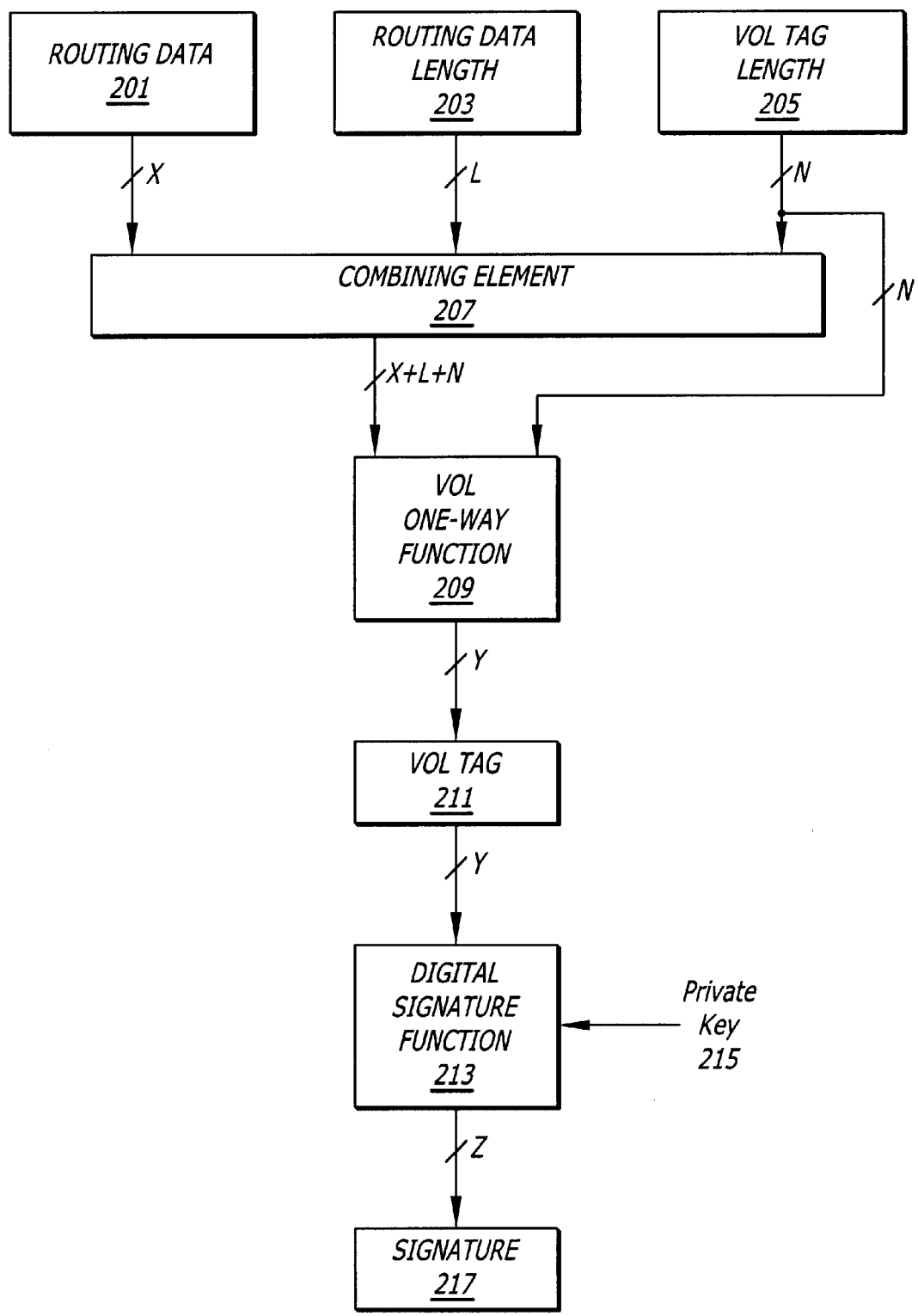
FIG. 2 is a block diagram illustrating elements of a box including a variable output length one-way function element in accordance with teachings of one embodiment of the present invention.

FIG. 2 is an illustration of elements included in a source box, such as for example a router, in accordance with the teachings of one embodiment of the present invention. As shown in FIG. 2, routing data 201, a routing data length 203 and a VOL tag length 205 are provided to one input of the VOL one-way function element 209. Another input of the VOL one-way function element 209 is coupled to receive the VOL tag length 205 itself.

In one embodiment, routing data 201, routing data length 203 and VOL tag length 205 are combined using a combining element 207 before they are provided to the input of VOL one-way function element 209. In one embodiment, combining element 207 may be a memory element, a register, or any other element that can concatenate or combine routing data 201, routing data length 203 and VOL tag length 205.

In one embodiment, routing data 201 is generated in accordance with a known routing protocol such as for example but not limited to OSPF. In an embodiment using OSPF, routing data 201 contains link state information (LSA). It is appreciated that routing data 201 may be an arbitrary length and is represented in FIG. 2 as having a width of X bits. In the embodiment depicted in FIG. 2, routing data length 203 is depicted as having a width of L bits, which is used to indicate the length of the routing data 201. VOL tag length 205 is depicted as having a width of N bits. Accordingly, as shown in FIG. 2, one embodiment of VOL one-way function element 209 is configured to receive X+L+N bits when receiving routing data 201, routing data length 203 and VOL tag length 205.

As shown in FIG. 2, one embodiment of VOL one-way function element 209 is also configured to receive N bits when receiving VOL tag length 205. In one embodiment, VOL tag length 205 may be adjusted to vary the length of the VOL tag 211 that is generated by VOL one-way function element 209. As shown in FIG. 2, VOL tag 211, which is generated by VOL one-way function element 209 is represented as having a width of Y bits. For example, if in one embodiment VOL tag length 205 is a value equal to 8 (eg. binary 0100), then the output of VOL one-way function will be 8 bits wide.

In one embodiment of the present invention, VOL one-way function element 209 utilizes known one-way function techniques to generate a VOL tag 211 having the variable width equal to VOL tag length 205. In one embodiment, VOL one-way function element 209 is based on the function H that is relatively easy to compute but computationally infeasible to invert. Stated differently, given a value x and a variable length N, it is relatively easy to compute $H(x,N)$, but computationally infeasible to compute x given $H(x,N)$. Indeed, this explains the name "one-way" function. Another characteristic of the function H is that it is difficult to find two values x and y such that $H(x,N)=H(y,N)$. This characteristic of H may be described as collision resistance.

It is appreciated that the one-way functions are known in the art and are sometimes referred to as hash functions or trap door functions. It is noted that one-way functions are useful for authenticating data, even though they are not generally used for encrypting data such as known private/public key cryptography techniques. However, when comparing one-way functions with private/public key cryptography techniques, it is noted that one-way functions are not as computationally intensive operations. Therefore, one embodiment of the present invention uses a VOL one-way function instead of a private/public key cryptography technique to authenticate the routing data because a VOL one-way function will have less of an overall impact on the workload of a box that needs to generate the VOL tag. It is worthwhile to note that it is common for routing data to sometimes include relatively large amounts of data. In addition, it is noted that it is common for routing data to be generated and transferred among the boxes of a routing domain relatively often, such as for example every one to five seconds.

In one embodiment, the one-way function used by the VOL one-way function element 209 utilizes a known one-way hashing algorithm called HAVAL (A One-Way Hashing Algorithm with Variable Length of Output). Detailed information describing HAVAL may be found in Zheng et al., "HAVAL—A One-Way Hashing Algorithm with Variable Length of Output" (Jul. 28, 1994). This document is incorporated herein by reference in its entirety. It is approciatod that other embodiments of the present invention may utilize other one-way functions featuring variable output lengths in accordance with the teachings of the present invention.

In another embodiment of the present invention, it is noted that the VOL tag 211 is digitally signed to certify the source of the VOL tag 211 using known techniques. In particular, known private/public key cryptography techniques may be used to certify the source of VOL tag 211 in accordance with the teachings of the present invention. As shown in FIG. 2, a digital signature function element 213 is coupled to receive a private key 215 of the source box and VOL tag 211. Digital signature function element 213 generates a signature 217, which is illustrated in FIG. 2 as having a width of Z bits.

In one embodiment, it is assumed that the source box generating VOL tag 211 has a secret or private key 215 that is known only to the source box that is generating VOL tag 211. This private key 215 is used to sign VOL tag 211 when generating signature 217. In addition, it is assumed that all other boxes in the routing domain know in advance the public key of the source box that generates VOL tag 211. Thus, any destination box that receives signature 217 will be able to certify that VOL tag 211 originated from the source box that generated VOL tag 21 1 by using the appropriate public key of the source box when decoding signature 217.

It is worthwhile to note that it is assumed that X>>Y such that VOL tag 211 (Y bits) is much smaller than routing data 201 (X bits) in one embodiment of the present invention. Therefore, it is computationally feasible to digitally sign and decode VOL tag 211 in one embodiment of the present invention without appreciably affecting the overall workload of the box.

Figure 3:
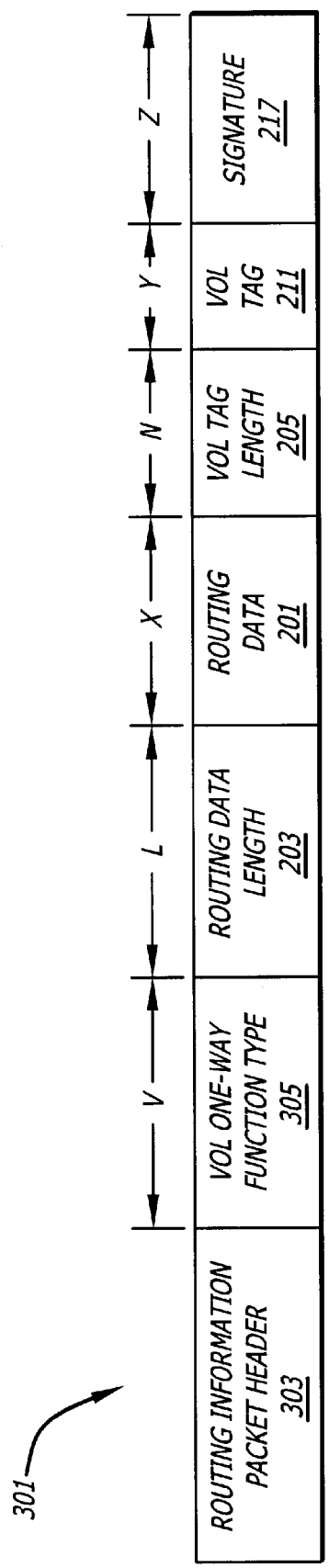
FIG. 3 is an illustration of a packet including a variable output length tag in accordance with the teachings of one embodiment of the present invention.

FIG. 3 is an illustration of one embodiment of a packet 301 that is transferred among boxes in the network in accordance with the teachings of present invention. As shown in FIG. 3, packet 101 includes a routing information packet header field 303, a VOL one-way function type field 305 in addition to routing data length 203, routing data 201 VOL tag length 205, VOL tag 211 and signature 217 fields. In one embodiment, packet 301 is transferred among the boxes whenever routing data 201 is distributed through the network in accordance with the routing protocol that is used for that particular network.

In one embodiment, routing information packet header 303 includes information that indicates the source box of routing data 201, which will be used by the destination box that receives packet 301 when decoding signature 217 in accordance with the teachings of the present invention. In one embodiment, routing information packet header 303 is an Internet protocol (IP) to header. In one embodiment, it is also assumed that routing information packet header 303 includes appropriate header control bits to indicate that the VOL one-way function aspect of the present invention is included in packet 301. In one embodiment, of VOL one-way function type field 305 is V bits wide and includes information indicating which particular VOL one-way hash function is used for generating and interpreting packet 301. For example, in one embodiment VOL one-way function type 305 indicates that HAVAL is used by VOL one-way function 209. Therefore, a box receiving packet 301 will be able to properly interpret the VOL one-way function type 305, routing data length 203, routing data 201, VOL tag length 205, VOL tag 211 and signature 217 fields of packet 301 in accordance with the teachings of the present invention. In one embodiment, it is noted that routing data length 203 field acts as an offset to the routing data 201 field. Similarly, it is noted that in one embodiment VOL tag length 205 acts as an offset to the VOL tag 211 field.

Figure 4:
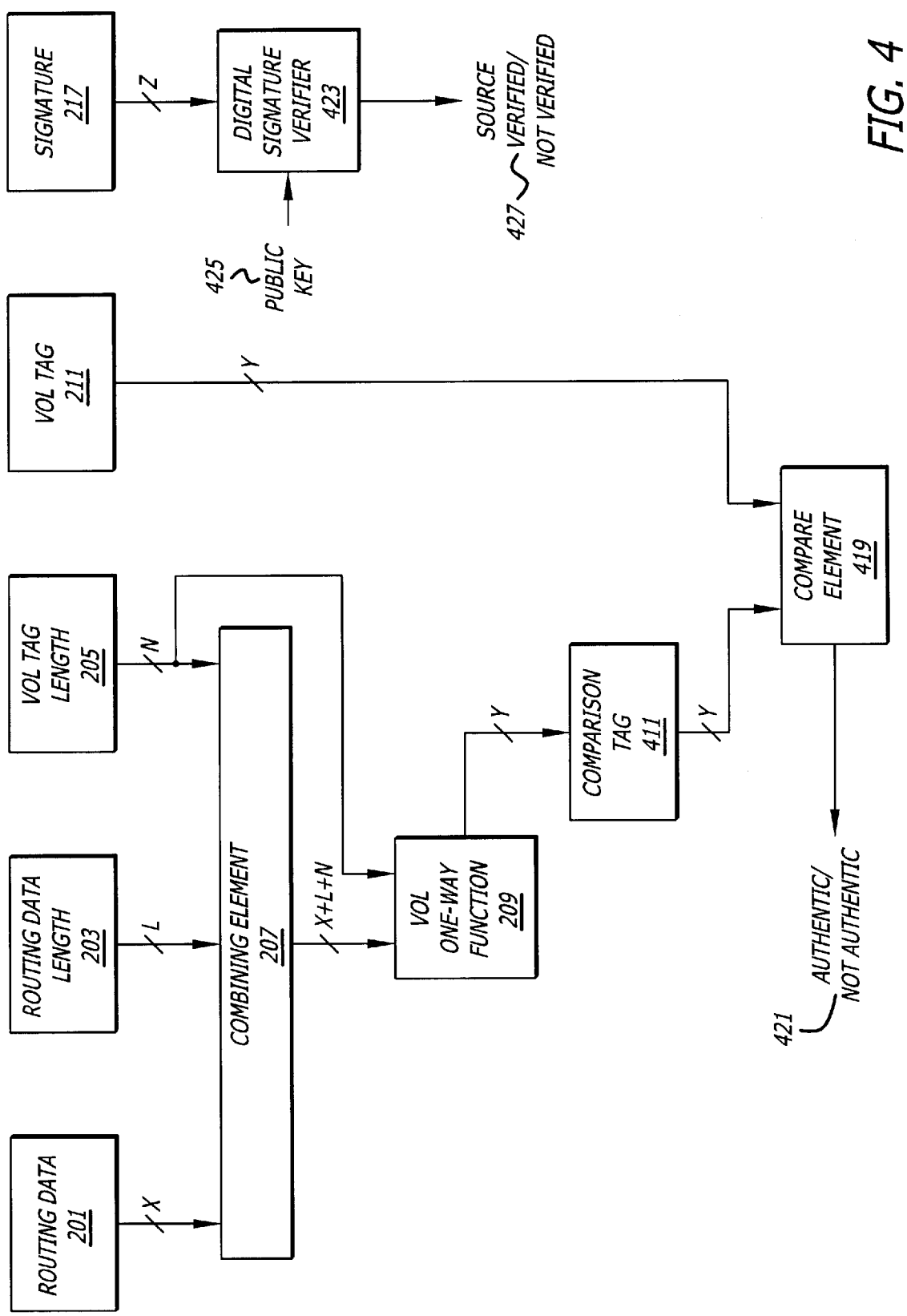
FIG. 4 is a block diagram of another embodiment of the present invention illustrating elements of a box including the variable output length one-way function element.

FIG. 4 is a block diagram illustrating elements of a destination box receiving a packet 301 in accordance with the teachings of the present invention. It is appreciated that the elements illustrated in FIG. 4 may also be included in the same source box that includes the elements illustrated in FIG. 2. In such an embodiment, the box could act both as a source or destination of packets 301. As shown in FIG. 4, the X bits of the received routing data 201, the L bits of the received routing data length 203 and the N bits of the received VOL tag length 205 are provided into one input of VOL one-way function 209. The received N bits of the VOL tag length 205 itself is provided to the other input of VOL one-way function 209. In one embodiment, a combining element 207 is included to combine or concatenate the received routing data 201, routing data length 203 and VOL tag length 205 fields. In an embodiment in which the elements of FIG. 4 are included in the same box as the elements of FIG. 2, it is appreciated that the combining elements 207 and VOL one-way function elements 209 of FIGS. 2 and 4 may be either the same elements or separate elements.

In one embodiment, the VOL one-way function element 209 generates a comparison tag 411. As shown in FIG. 4, the Y bits of comparison tag 411 are compared with the Y bits of the received VOL tag 211 with compare element 419. If comparison tag 411 matches the received VOL tag 211, then compare element 409 generates a signal 421 that indicates that the received VOL tag 211 is authentic. If comparison tag 411 does not match the received VOL tag 211, then compare element 409 generates signal 421 that indicates that the received VOL tag 211 is not authentic.

In one embodiment, a digital signature verifier 423 is coupled to receive a public key 425 of the source box and the received Z bits of signature 217. As mentioned earlier, in one embodiment, public key 425 of the source box may be determined based on the routing information packet header field 303 discussed above in FIG. 3. It is appreciated that other known methods may be used to identify the source box for public key 425 as long as the source box of the received VOL tag 211 is known. In one embodiment, digital signature verifier 423 decodes the received signature 217 using public key 425 of the source box to certify the source of the received VOL tag 211. In one embodiment, digital signature verifier 423 generates a signal 427 that indicates that the source of the VOL tag 211 is verified or not verified using known public/private key cryptographic techniques.

In one embodiment of the present invention, it is assumed that more computing resources and/or time are consumed when computing a VOL tag 211 that is longer. Stated differently, it is assumed that less computing resources and/or time are consumed if computing a relatively short VOL tag 211. As described in detail above, the length Y of the VOL tag 211 can be adjusted based on the value indicated by VOL tag length 205.

Referring back to FIG. 2, it is appreciated that the value of VOL tag length 205 may be dynamically changed to accommodate the conditions of the network. For example, if the workload of the box generating or receiving VOL tag 211 increases, one may desire to decrease the length indicated by VOL tag length 205. If the workload of the box generating or receiving VOL tag 211 is relatively light, then one may desire to increase the value indicated by VOL tag length 205. It is noted that the trade-off of increasing or decreasing VOL tag length 205 is that if a shorter length is selected for VOL tag length 205, less computing resources are required to generate VOL tag 211. HQwever, there will be a corresponding increase in the possibility of a collision in VOL tag 211. Conversely, if a longer length is selected for VOL tag length 205, there is a lower probability that there will be a collision in VOL tag 211. However, more computing resources are required to generate VOL tag 211.

Therefore, in one embodiment of the present invention, VOL tag length 205 may be adjusted dynamically to accommodate conditions in the network. Referring back to FIG. 1, if traffic is relatively heavy in area 105, relatively light in area 103 and relatively normal in areas 107 and 109, the VOL tag lengths for areas 105, 103, 107 and 109 can be set to short, long, medium and medium values, respectively. When traffic returns to normal levels in all of the areas, the VOL tag lengths may all then be adjusted back to medium values.

Thus, what has been described is a method and apparatus for authenticating routing data that is transferred among boxes and a network. In the foregoing detailed description, the method and apparatus of the present invention has been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. A method for transferring routing data in a network, the method comprising the steps of:
    determining an adjustable tag length for a variable output length (VOL) one-way function;
    performing the VOL one-way function on the routing data, the VOL one-way function generating a tag having the adjustable tag length; and
    transmitting the routing data with the tag from a first box of the network to a second box of the network.

2. The method of claim 1 including the additional steps of:
    receiving the routing data with the tag;
    performing the VOL one-way function on the received routing data to generate a comparison tag having the adjustable tag length; and
    comparing the received tag with the comparison tag.

3. The method of claim 2 including the additional step of transmitting the adjustable tag length with the routing data and the tag from the first box of the network to the second box of the network.

4. The method of claim 3 including the additional step of performing the VOL one-way function on a routing data length with the adjustable tag length for the VOL one-way function and the routing data to generate the tag.

5. The method of claim 4 including the additional step of transmitting the routing data length with the routing data and the adjustable tag length and the tag from the first box of the network to the second box of the network.

6. The method of claim 5 including the additional steps of:
    receiving the routing data length and the adjustable tag length with the routing data and the tag; and
    performing the VOL one-way function on the received routing data length and the received adjustable tag length with the received routing data to generate the comparison tag having the adjustable tag length.

7. The method of claim 1 wherein the routing data corresponds to the first box, the method including the additional steps of:
    performing a signature function using a private key of the first box on the tag to generate a signature; and
    transmitting the signature with the routing data and the tag from the first box to the second box.

8. The method of claim 7 including the additional steps of:
    receiving the signature with the routing data and the tag;
    decoding the signature using a public key of the first box to verify the tag.

9. The method of claim 8 including the additional step of identifying the public key to use for decoding the signature in response to routing information packet header received with the routing data, the tag and the signature.

10. The method of claim 1 including the additional step of adjusting the adjustable tag length for the VOL one-way function.

11. The method of claim 10 wherein the step of adjusting the adjustable tag length of the VOL one-way function is performed to adjust a workload of the first box.

12. The method of claim 10 wherein the step of adjusting the adjustable tag length of the VOL one-way function is performed to adjust a workload of the second box.

13. A box in a network, comprising:
    a routing data generator to generate routing data of the box, the box to transfer the routing data to another box in the network; and
    a variable output length (VOL) one-way function element coupled to receive an adjustable tag length and the routing data from the routing data generator to generate the tag having the adjustable tag length, the box to transfer the tag to the other box in the network to authenticate the routing data.

14. The box of claim 13 wherein the VOL one-way function element is further coupled to receive a routing data length, the VOL one-way function element to generate the tag in response to the routing data, the routing data length and the adjustable tag length.

15. The box of claim 14 further comprising a combining element coupled between the routing data generator and the VOL one-way function element, the combining element coupled to receive the routing data, the routing data length and the adjustable tag length for combination into the VOL one-way function element.

16. The box of claim 13 further comprising a signature function element coupled to receive the tag from the VOL one-way function element and a private key of the box to generate a signature, the signature function element generating the signature using a private key of the box, the box to transfer the signature to the other box and the network to certify the tag.

17. The box of claim 13 wherein the routing data includes information regarding a topology of the network.

18. The box of claim 13 further comprising a compare element to compare a tag received from the other box with a comparison tag generated by the VOL one-way function element in response to routing data received from the other box.

19. The box of claim 16 further comprising a signature verification element coupled to receive a signature received from the other box and a public key of the other box to verify a tag received from the other box.

20. The box of claim 13 wherein the box comprises a network router.

21. A method for transferring routing data in a network, the method comprising the steps of:
generating the routing data in response to at least a portion of a topology of the network, the routing data having a routing data length;
performing a variable output length (VOL) one-way function on the routing data, the routing data length and an adjustable length to generate the tag having the adjustable tag length; and
transferring the routing data, the routing data length, the adjustable tag length and the tag from a first box of the network to a second box of the network.

22. The method of claim 21 including the additional steps of:
receiving the routing data, the routing data length, the adjustable tag length and the tag with the second box;
performing the VOL one-way function on the received routing data, the received routing data length and the received adjustable tag length to generate a comparison tag; and
comparing the received tag with the comparison tag to authenticate the routing data, the routing data length and the adjustable tag length.

23. The method of claim 21 including the additional steps of:
performing a signature function on the tag using a private key of the first box to generate a signature; and
transferring the signature from the first box of the network to the second box of the network.

24. The method of claim 23 including the additional steps of:
receiving the signature with the second box; and
performing a signature verification function on the signature using a public key of the first box to certify the received tag.

25. The method of claim 21 including the additional step of adjusting a workload of the first box of the network and a workload of the second box of the network.

26. The method of claim 25 wherein the step of adjusting the workload of the first box of the network and the workload of the second box of the network includes the step of adjusting the adjustable tag length.

27. The method of claim 22 including the additional step of transferring a VOL one-way function type from the first box of the network to the second box of the network.

28. The method of claim 27 including the additional step of receiving the VOL one-way function type with the second box of the network, wherein the step of performing the VOL one-way function on the received routing data includes the step of interpreting the received VOL one-way function type.

* * * * *